United States Patent
Widener et al.

(10) Patent No.: US 10,009,517 B1
(45) Date of Patent: Jun. 26, 2018

(54) EXTENDED GAMUT COLORANT FOR PRINT JOB BASED ON USER PREFERENCES

(71) Applicant: Xerox Corporation, Norwalk, CT (US)

(72) Inventors: Gregory S. Widener, Pittsford, NY (US); Michael R. Campanelli, Hammondsport, NY (US); Timothy D. Uetz, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 14 days.

(21) Appl. No.: 15/378,163

(22) Filed: Dec. 14, 2016

(51) Int. Cl.
*H04N 1/60* (2006.01)

(52) U.S. Cl.
CPC .......... *H04N 1/6066* (2013.01); *H04N 1/6008* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,892,891 A | 4/1999 | Dalal et al. | |
| 6,038,373 A | 3/2000 | Matsumoto et al. | |
| 6,698,860 B2 | 3/2004 | Berns et al. | |
| 7,164,498 B2 | 1/2007 | Van Bael | |
| 7,355,745 B2 | 4/2008 | Hudson et al. | |
| 7,515,300 B2 | 3/2009 | Takahashi et al. | |
| 7,573,620 B2 | 8/2009 | Presley et al. | |
| 7,990,592 B2 | 8/2011 | Mestha et al. | |
| 7,995,255 B2 | 8/2011 | Boll | |
| 8,077,352 B2 | 12/2011 | Bernal et al. | |
| 8,605,329 B2 | 12/2013 | Shestak et al. | |
| 8,736,930 B2 | 5/2014 | Robinson et al. | |
| 2008/0273794 A1 | 11/2008 | Samworth | |
| 2008/0291479 A1 | 11/2008 | Mestha | |
| 2011/0032573 A1 | 2/2011 | Dalal | |
| 2013/0265598 A1 | 10/2013 | Donaldson et al. | |

*Primary Examiner* — Christopher D Wait
(74) *Attorney, Agent, or Firm* — Gibb & Riley, LLC

(57) ABSTRACT

Methods, devices, and systems automatically generate electronic images of the printed appearance of a multi-color image using first print processing to generate a first sample image, and using second print processing to generate a second sample image. Pixels in the first sample image and the second sample image are compared to a color standard to generate a first error value and a second error value. The first error value is compared to the second error value for each pixel to produce an error value reduction associated with the second print processing for each pixel of the multi-color image. The error value reduction for each pixel of the multi-color image is compared to a threshold to identify benefited pixels. The benefited pixels can be displayed on a contrasting background, and/or the electronic image can be automatically printed using the second print processing if the benefited pixels exceed a minimum value.

20 Claims, 7 Drawing Sheets
(3 of 7 Drawing Sheet(s) Filed in Color)

EXTENDED GAMUT COLORANT FOR PRINT JOB BASED ON USER PREFERENCES

BACKGROUND

Systems and methods herein generally relate to printing systems and methods that use extended gamuts and extension colors.

In order to print using colors other than the printer's permanent colors that are used for all print jobs, or the vast majority of print jobs (e.g., colors other than the printer's permanent colors of red, green, blue (RGB); other than cyan, yellow, magenta, black (CMYK); etc.), such as orange, green, blue, etc., some printers include an additional housing (sometimes referred to as the 5th color housing, or Xth housing if more than 5 are enabled) that holds replaceable printing modules (sometimes referred to as a customer replaceable unit (CCU), 5th color module, spot color module, or imaging media cartridges) that are separate from the permanent color printing modules. This allows users to selectively use one or more extended gamuts by switching the replaceable printing modules, which can be done seamlessly in minutes. However, the fifth colorants (spot colors) are more expensive than the printer's permanent colors, and the majority of customers will not know when to use the extra colorant.

Historically, customer usage of extra colorants/toner is very limited due to the extra cost and setup required to turn on the additional color selectively. Also, going back to the document creator to have them embed color selections takes time and is not efficient.

SUMMARY

Methods, devices, and systems herein automatically generate electronic images of the printed appearance of a multi-color image using first print processing to generate a first sample image, and using second print processing to generate a second sample image. The different types of print processing can use or omit extension colorants, use different droplet sizes, use different equipment, etc.

Pixels in the first sample image and the second sample image are compared to a color standard to generate a first error value and a second error value. The first error value is compared to the second error value for each pixel to produce an error value reduction associated with the second print processing for each pixel of the multi-color image. The error value reduction for each pixel of the multi-color image is compared to a threshold to identify benefited pixels that have an error value reduction that exceeds the threshold. The benefited pixels can be displayed on a contrasting background, and/or the electronic image can be automatically printed using the second print processing if the benefited pixels exceed a minimum value (e.g., exceed a minimum average Delta-E reduction, cover more that a minimum area of the printed image, etc.).

More specifically, in some exemplary methods, the image processor automatically generates a base color sample image and an extended color sample image for the multi-color image. These methods do this by automatically generating an electronic image of the printed appearance of the multi-color image using a base colorant set of base colors to generate the base color sample image, and by automatically generating an electronic image of the printed appearance of the multi-color image using the base colorant set combined with an extension color to generate the extended color sample image. The process of generating the base color sample image and the extended color sample image comprises raster image processing the multi-color image to produce different bitmaps for the base color sample image and the extended color sample image.

These methods also automatically determine, using the image processor, a base color error value for pixels of the base color sample image and an extended color error value for pixels of the extended color sample image. This is performed by automatically comparing pixels in the base color sample image and the extended color sample image to a color standard. Thus, the base color error value and the extended color error value comprise color distances from the color standard, and the color standard comprises a color definition provided by a standards organization.

In these methods the image processor identifies benefited pixels of the multi-color image (those pixels that have an error value reduction associated with the extended color that exceeds a threshold) by automatically determining how much the base color error value exceeds the extended color error value for each pixel of the multi-color image to produce the error value reduction for each pixel of the multi-color image, and by comparing the error value reduction for each pixel of the multi-color image to the threshold. This threshold defines the minimum visually perceptible difference between colors. In addition, the electronic display can be used to display an option to change the threshold, allowing the user to adjust the level of color change considered. With these methods, an electronic display that is operatively connected to the image processor, can display only the benefited pixels on a contrasting background and/or the electronic image can be automatically printed using the second print processing, if the benefited pixels exceed a minimum value (e.g., exceed a minimum average Delta-E reduction, cover more that a minimum area of the printed image, etc.).

In additional processing of the methods herein, the image processor automatically identifies changed pixels of the multi-color image as those that have an error value reduction that is between zero and the threshold, but do not exceed the threshold as the benefited pixels did. Similarly, the changed pixels can be displayed on the electronic image using a contrasting color.

Additionally, these methods identify (using the image processor) the amount of marking material the base color sample image and the extended color sample image would utilize to be printed. Using this, these methods can then display (using the electronic display) the base color sample image and the extended color sample image, as well as the amount of marking material the base color sample image and the extended color sample image would utilize to be printed. This allows the user to observe the appearance difference of using the extended color, as well as the increase or reduction of toner usage that will occur with use of the extended color.

Apparatuses (printers, machines, systems, etc.) herein include, among other components, an image processor (that receives a print job comprising a multi-color image) and an electronic display operatively connected to the image processor.

The image processor generates a base color sample image and an extended color sample image for the multi-color image. The image processor does this by automatically generating an electronic image of the printed appearance of the multi-color image using a base colorant set (of base colors) to generate the base color sample image. The image processor also does this by automatically generating an electronic image of the printed appearance of the multi-color image using the base colorant set combined with an extension color to generate the extended color sample image.

More specifically, the image processor generates the base color sample image and the extended color sample image by raster image processing the multi-color image to produce different bitmaps for the base color sample image and the extended color sample image. The image processor also determines a base color error value for pixels of the base color sample image and an extended color error value for pixels of the extended color sample image. The image processor does this by automatically comparing pixels in the base color sample image and the extended color sample image to a color standard.

The image processor also identifies benefited pixels of the multi-color image that have an error value reduction associated with the extended color that exceeds a threshold. The image processor does this by automatically determining how much the base color error value exceeds the extended color error value for each pixel of the multi-color image to produce the error value reduction for each pixel of the multi-color image, and by comparing the error value reduction for each pixel of the multi-color image to the threshold to identify the benefited pixels. The electronic display provides an option to change the threshold. The error value reduction that exceeds the threshold defines a minimum visually perceptible difference between colors. The base color error value and the extended color error value comprise color distances from the color standard. The color standard comprises a color definition provided by a standards organization. The electronic display displays only the benefited pixels on a contrasting background and/or the processor can be configures to automatically print the electronic image using the second print processing if the benefited pixels exceed a minimum value (e.g., exceed a minimum average Delta-E reduction, cover more that a minimum area of the printed image, etc.).

The image processor also identifies changed pixels of the multi-color image that have an error value reduction that is between zero and the threshold. Thus, the electronic display displays the changed pixels on the electronic image using a contrasting color.

Further, the image processor identifies the amount of marking material the base color sample image and the extended color sample image would utilize to be printed. Therefore, the electronic display displays the base color sample image and the extended color sample image and the amount of marking material the base color sample image and the extended color sample image would utilize to be printed to help the user to decide whether to use the extended color.

These and other features are described in, or are apparent from, the following detailed description.

BRIEF DESCRIPTION OF THE DRAWINGS

The patent or application contains at least one drawing executed in color. Copies of patent or patent application publication with color drawing(s) will be provided by the Office upon request and payment of the necessary fee.

Various exemplary systems and methods are described in detail below, with reference to the attached drawing figures, in which.

DETAILED DESCRIPTION

As noted above, customer usage of extra colorants/toner is very limited due to the extra cost and setup required to turn on the additional color selectively. The systems and methods described herein allow the user to easily view the costs and benefits of using the extra colorants directly in their print jobs, and therefore readily convey the necessary information customers use to select extended gamut colorants. Additionally, these systems and methods create triggers with user selectable thresholds, to enable users to more freely use the extra colorants when there is quantified benefit.

Extended gamut print engines have the capability to both selectively use the extended color by object and color space, and allow the user to define criteria that will trigger automatic use of the extra colorant. When job programming an extended gamut job, two destination profiles are applied to the job. One is for printing to the extended gamut (e.g., CMYK+Orange), and the other is for printing to the base gamut (CMYK). Also, many printers have a pre-flight capability which can identify spot calls within a printer description language (PDL) file targeted for raster image processing (RIPing).

Given these two profiles, various "coverage" and "accuracy" measures can be calculated and compared with trigger points selected by the user. For example, this allows systems and methods herein to identify colors in the profiles which should be rendered using the extended gamut (e.g., spot colors); Delta-E measures can be taken when rendered in the extended gamut profile; visual comparisons between objects can be rendered using both profiles; and percent toner coverages (usage) between the two profiles can be computed (and in some cases the extended gamut can reduce overall toner usage).

As is understood by those ordinarily skilled in the art, Delta-E ($\Delta E$, error change, color error value, etc.) is a single number that represents the 'distance' between two colors, and shows how much a color that is printed or displayed deviates from the desired color standard (e.g., Pantone® 101C). Thus, Delta-E illustrates how far off is a print or proof is from the original desired color, how much has a device drifted, how effective a particular profile is for printing or proofing, etc. Note that any color space can be used by methods and devices herein including, for example, RGB (red, green, blue), Lab (CIELAB (or $L^*a^*b^*$), YUV (luma (Y') and chrominance (UV)), YCrCb (Y' is the luma component, and CB and CR are the blue-difference and red-difference chroma components), CMYK (cyan, magenta, yellow, black, etc.), etc.

Figure 1:
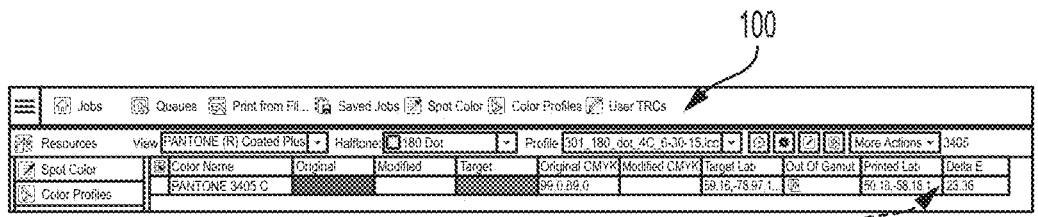
FIGS. 1 and 2 are schematic diagrams illustrating displays provided to users showing Delta-E measures.
Figure 2:
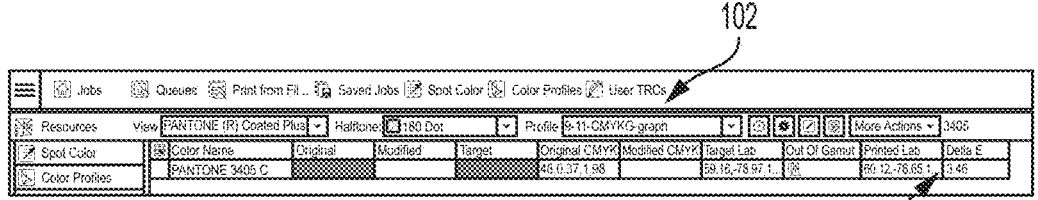

Spot colors represent a special case, in that the entire list of spot colors along with the CMYK and CIELAB values are available at one of the processors (e.g., digital front end (DFE)). The entire spot color list can be compared before raster image processing (RIPing) to determine if the accuracy in the spot rendering improves enough to warrant rendering in the 5th color. For example, as shown in the partial display 100 in FIG. 1, the spot color "Pantone 3405 C" rendered in CMYK has a Delta-E of 23.36 and, as shown in the partial display 102 in FIG. 2, a Delta-E of 3.46 when rendered in CMYK-Green. A minimum Delta-E difference of 1 is generally considered to be the minimum human visually distinguishable Delta-E difference, and 3 Delta-E provides sufficient safeguard to be applicable to general populations. The Delta-E reduction in this example is 19.9 (Delta-E of 23.36 minus Delta-E of 3.46), which is greater than Delta-E of 3 and would be detectable by users.

Thus, the Delta-E differences between renderings can be compared and the Delta-E values either displayed to the user, or automatically compared to trigger values. This can be a pre-press operation, but could be done during printing, given enough processing power. For example, the following table illustrates triggers that are user-adjustable, allowing customers to select which objects they are interested in, which color spaces, which extension color, and the criteria to be used for the triggers.

| Objects | Color Space | 5$^{th}$ Color | Criteria |
|---|---|---|---|
| Image | Spot | Orange | Average Gamut improvement is > user specified Delta-E |
| Graphic (Vector) | RGB | Green | Color Toner usage is > user specified threshold |
| Text | CMYK | Blue | 5$^{th}$ color Toner coverage is > user specified threshold |
| | Grayscale | | Dark colors and shadow detail improve by Delta-E threshold Colors using EG (Extended Gamut) improve and not dark colors |

Figure 3:
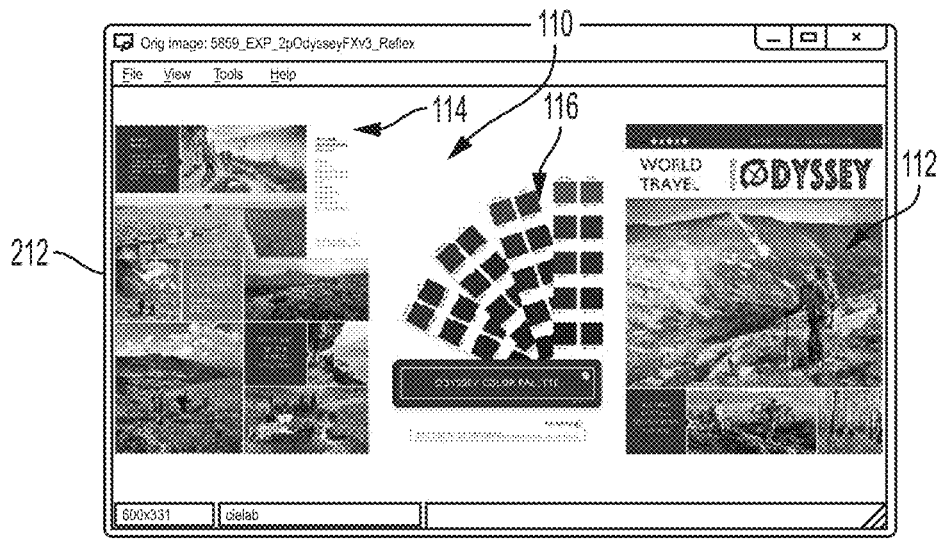
FIGS. 3-5 are schematic diagrams illustrating displays provided to users showing changes in visual appearance of images.

FIG. 3 is produced by methods and systems herein and illustrates a display device 212 displaying an original image 110 within a print job showing rendering content with image 112, text 114, and spot colors. The square patch palettes 116 in the center of the original image 110 compare CMYK color to spot color (spots are on the left of the square patch pairs on the pallets 116).

Figure 4:
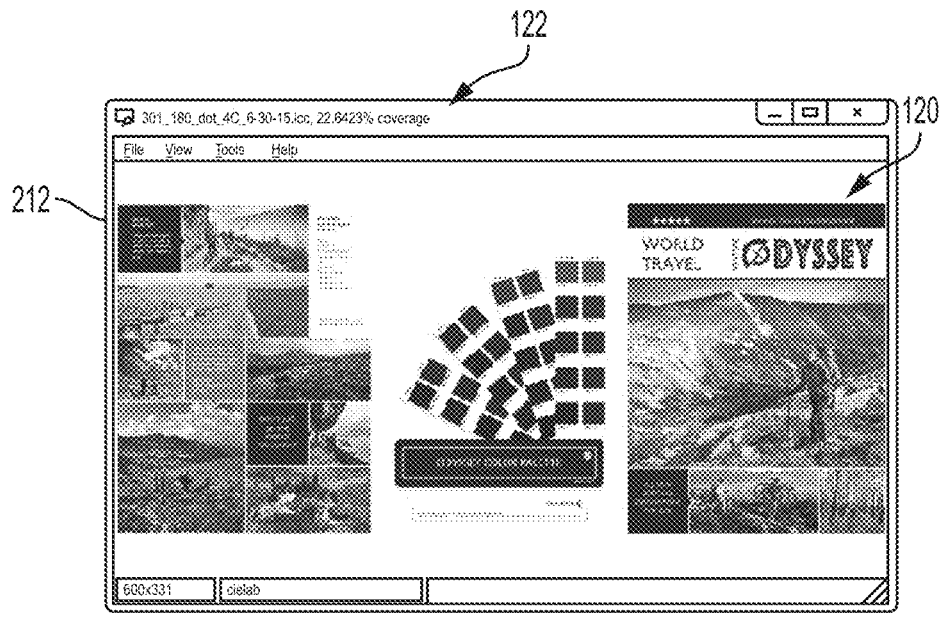
Figure 5:
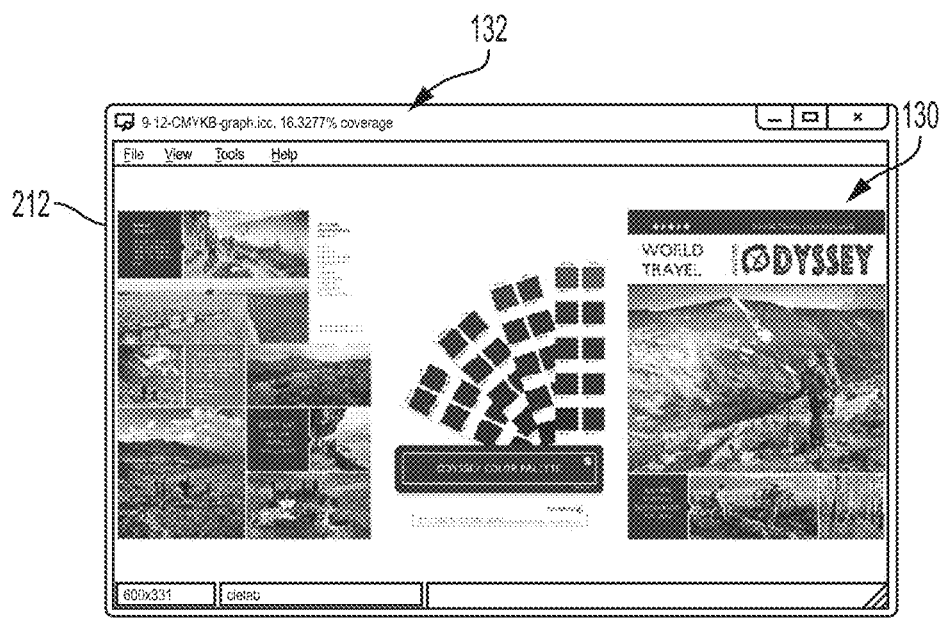

FIGS. 4 and 5 are produced by methods and systems herein. FIG. 4 illustrates the display device 212 displaying a CMYK image rendering 120, and FIG. 5 illustrates the display device 212 displaying a CMYK+Blue image rendering 130 CMYK+Blue. The visual difference shown on the display device 212 between the CMYK image rendering 120 and the CMYK+Blue image rendering 130 in the color drawings accompanying this application visually illustrates the benefit of choosing the extended gamut rendering using CMYK+Blue by showing the blue colors as deeper and darker blues.

Additionally, the title bar 122, 132 of FIGS. 4 and 5 includes a description of the profile that rendered the image, and the overall toner coverages of all image separations. FIGS. 4 and 5 show that choosing to use the CMYK+Blue colorant actually reduces the overall toner usage, thus saving money. More specifically, title bar 122 in FIG. 4 shows that the unextended gamut CMYK uses more toner (22.6423% coverage), while the title bar 132 in FIG. 5 shows that the extended gamut CMYK+Blue uses less toner (16.3277% coverage), showing that the CMYK+Blue image rendering will use less toner than the CMYK rendering.

Figure 6:
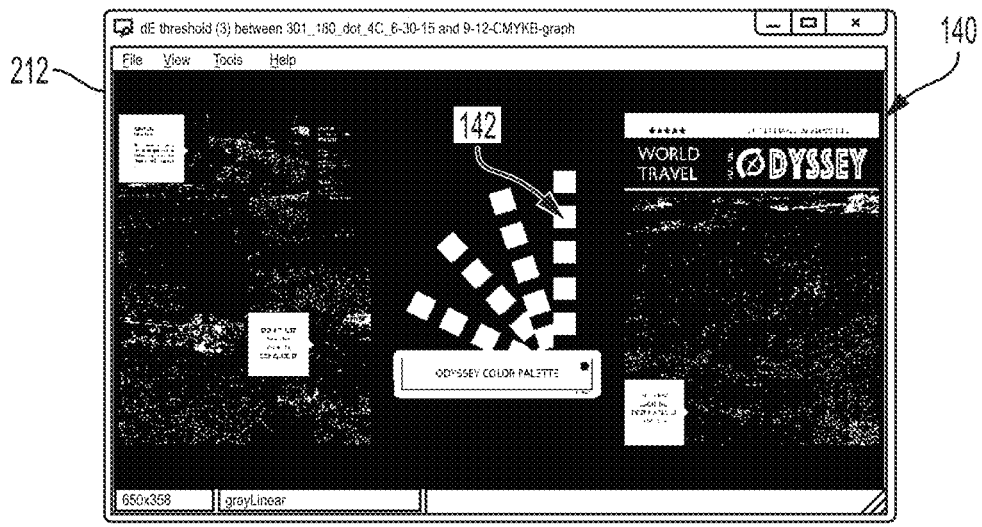
FIGS. 6 and 7 are schematic diagram illustrating displays provided to users showing limited color changes.

FIG. 6 is produced by methods and systems herein and shows a continuation of the same example that starts with the original image 110 shown in FIG. 3. FIG. 6 displays a Delta-3 image 140 that includes a white pixel for any area of the original image 110 that will benefit by a 3 or more Delta-E difference using the extended colorant of blue (rendered using CMYK+Blue). In particular, the spot colors 142 (left column of square patches on pallets 116 in FIG. 3, in the center of the image) are all rendered at least Delta-3 better with the extended gamut blue colorant, while the unextended gamut adjacent the spot colors 142 do not appear as white pixels in FIG. 6. Therefore, by comparing the locations of the pallets 116 (shown in FIG. 3) to the white and dark pixels shown in FIG. 6, it can be seen that the spot colors 142 provide a visual benefit by a 3 or more Delta-E measure.

Figure 7:
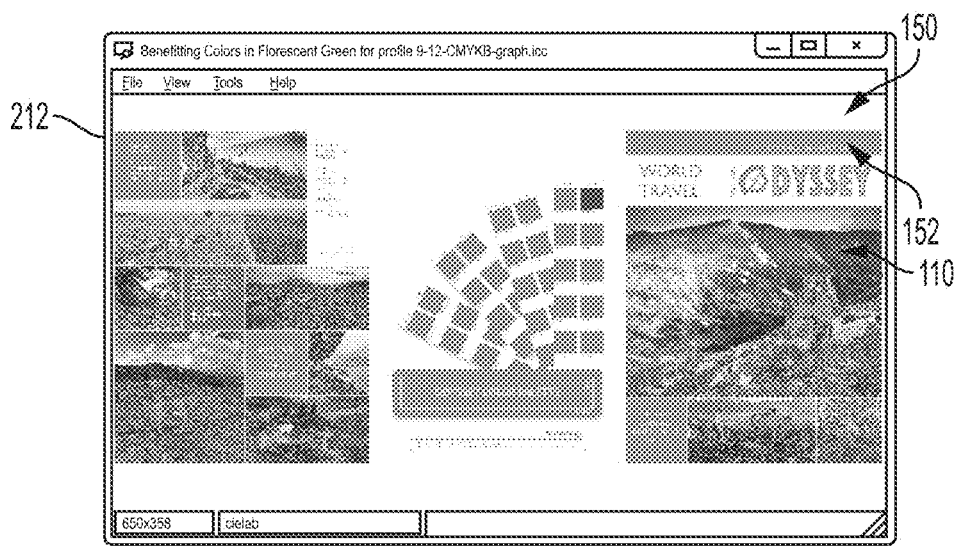

FIG. 7 is produced by methods and systems herein and highlights (e.g., using a fluorescent green color) all benefited areas 152 of the image that will benefit from using the extended gamut blue colorant. The measure for the rendering in FIG. 7 shows all colors outside of the CMYK gamut in the original electronic image 110 verses the CMYK+Blue gamut 152. Referring back to the palette colors 116 in the original image 110 shown in FIG. 3, FIG. 7 shows all benefiting colors 142, including those with less that a 3 Delta-E benefit. Therefore, when FIG. 7 is compared to the Delta-3 image 140 shown in FIG. 6, both columns of patch colors, the palette colors 116 will benefit, even though there is less than a 3 Delta-E difference for the non-spot colors in the palette colors 116.

Thus, these systems and methods enable accurate user understanding of which pixels in a rasterized image will benefit from an extended gamut colorant. All color spaces in the page description language or PDL (e.g., RGB, CMYK, spots, separation, DeviceN) are rendered by the raster image processor, which contains all the raster image processor's image processing complexity to the extended gamut color print space. This print space is then compared to the possible CMYK print space to determine the benefiting pixels within a job/page.

Additionally, the systems and methods herein allow user selection based on objects, color space, 5th color, and criteria that the user is interested in. Thus, if the user is only interested in spot colors, they can limit their selection to spots, and if the user is not interested in rendering images in an extended gamut, they can leave those out.

The systems and methods herein provide automation of job processing with extended gamut colorants based on user preferences, and enable comparison of image quality (IQ) benefits for any set of different profiles (for example a large drop size artisan destination profile vs. a small drop size artisan destination profile).

While the foregoing presents an example of whether an extended gamut (blue) should or should not be utilized, the systems and methods herein are equally useful for deciding which extended gamut (or combination of extended gamuts) should be utilized, which type of printing should be utilized (large drop, small drop, etc.), which processor or printer should be utilized, etc. Therefore, while some examples herein illustrate a manual or automated decision between whether or not to use an extension colorant, such examples are representative of many different printing profiles that may involve extended gamuts, different printing machines, different printing styles, etc.

As noted above, the systems and methods herein are very useful for deciding which extended gamut (or combination of extended gamuts) should be utilized, and not just whether or not an extended gamut should be used. Thus, in one example, FIG. 4 can alternatively illustrate a CMYK+Orange image rendering 120, while FIG. 5 can alternatively illustrate CMYK+Blue image rendering 130 to allow an automated or manual decision of which extended gamut colorant should be utilized. Similarly, for devices capable of utilizing multiple extended colorants simultaneously, FIG. 4 can alternatively illustrate a CMYK+Orange+Green image rendering 120, while FIG. 5 can alternatively illustrate CMYK+Blue+Green image rendering 130.

In other alternatives, different DFE's or different printing engines with different capabilities can be automatically selected. Therefore, in different implementations, FIG. 4 can alternatively illustrate a CMYK+Orange image rendering on machine A 120, while FIG. 5 can alternatively illustrate CMYK+Orange image rendering 130 on machine B to allow an automated or manual decision of which DFE or different printing engine should be utilized. Further, with respect to printing types, FIG. 4 can alternatively illustrate a CMYK+Orange image rendering using small drop type printing 120, while FIG. 5 can alternatively illustrate CMYK+Orange image rendering using large drop type printing 130 to allow an automated or manual decision of which drop type printing should be utilized. Those ordinarily skilled in the art what understand that the concepts presented here in are not limited to these examples, but are useful in all choices that can be made with respect to printing selection parameters.

Thus, automatic use of a specific printing profile can occur when, for example, any of the following exceed a relative threshold: average Delta-E reduction; color toner usage reduction; extension color toner coverage; dark colors and shadow detail average improvement in grayscale printing; only some colors improve (not dark colors) on average; etc. Further, the user is provided options to set and change such thresholds, as shown for example in FIG. 8.

Figure 8:
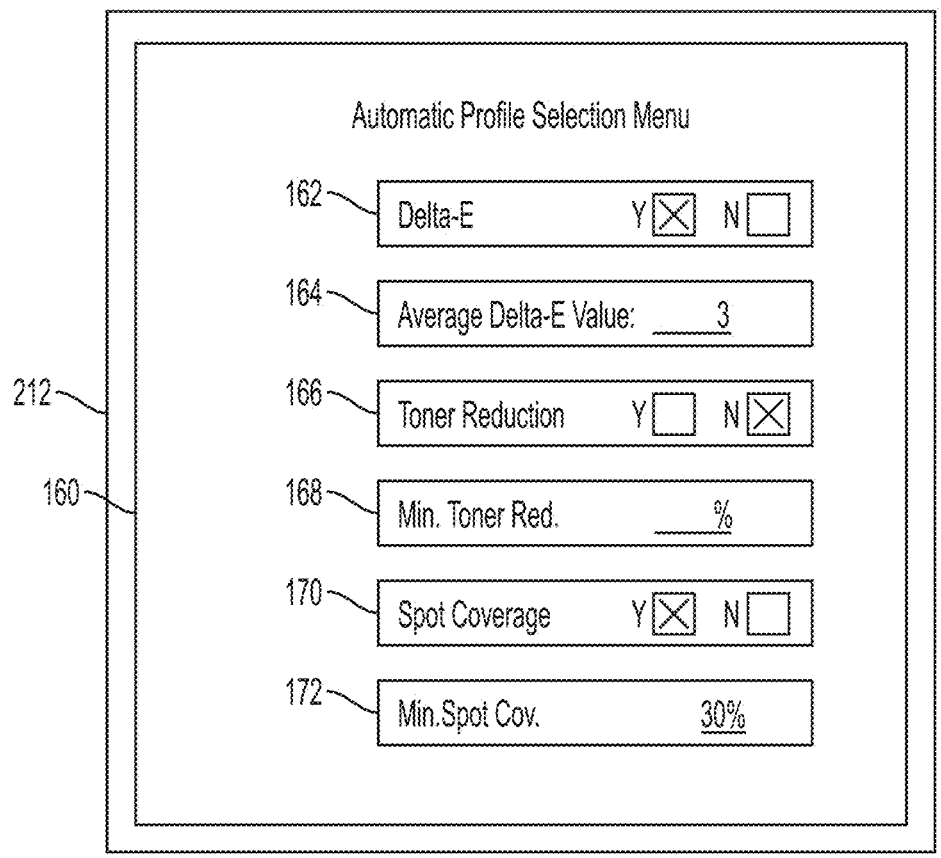
FIG. 8 is a schematic diagram illustrating an automatic profile selection menu.

More specifically, FIG. 8 illustrates an automatic profile selection menu 160 displayed on a display device 212. The menu 160 includes an option 162 as to whether a Delta-E difference will cause a print profile (e.g., extension gamut choice, machine choice, droplet choice, etc.) to be automatically selected, and a location 164 for the user to enter the average Delta-E threshold to cause automatic print profile selection. Similarly, the menu 160 includes an option 166 as to whether color toner reduction will cause automatic profile selection, and a location 168 to enter the minimum amount of toner reduction that will cause automatic print profile selection; an option 170 as to whether a minimum amount of spot color coverage will cause automatic profile selection, and a location 172 to enter the minimum amount of spot color coverage that will cause automatic print profile selection; etc. Those ordinarily skilled in the art would understand that menu 160 can be expanded to cover other factors that cause automatic print profile selection.

Figure 9:
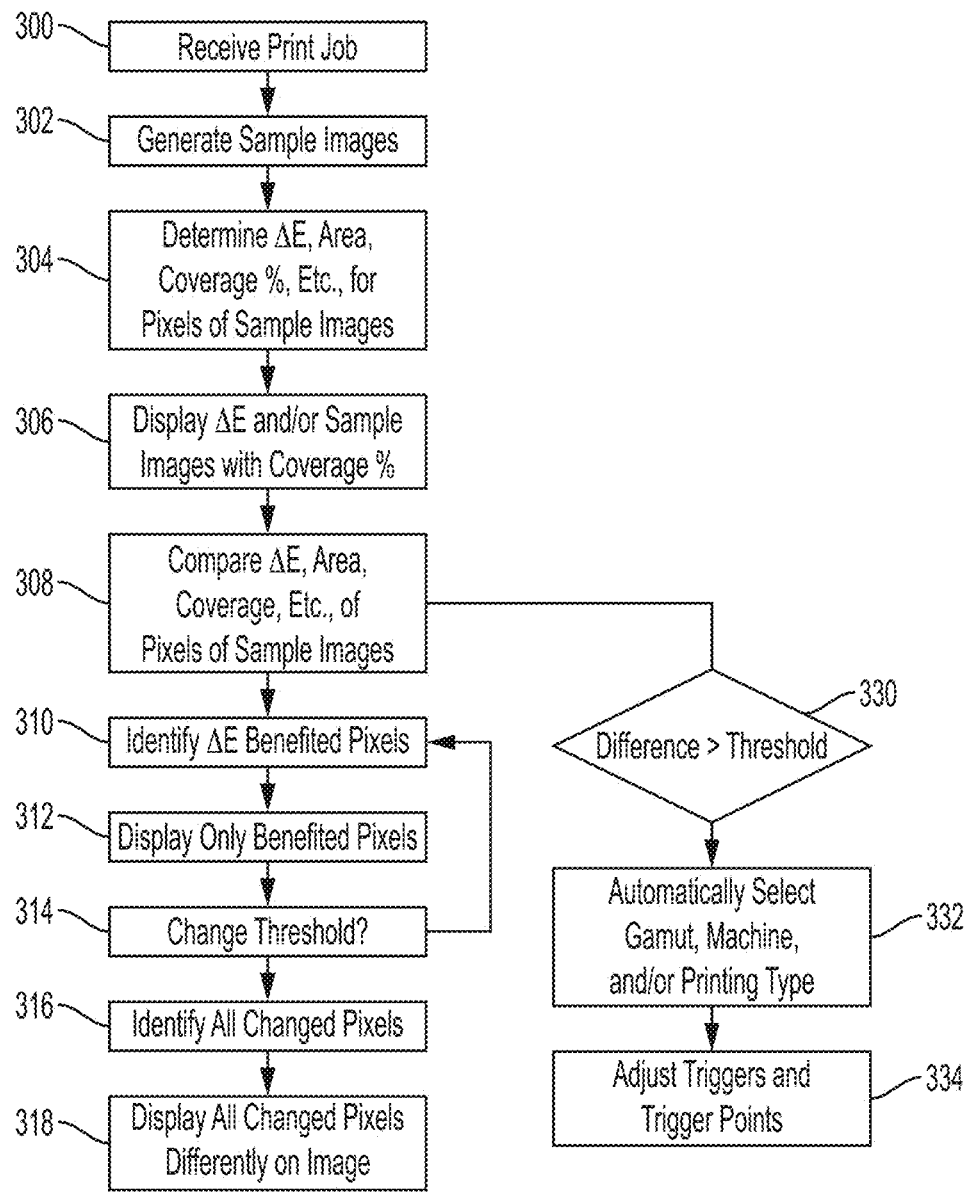
FIG. 9 is a flow diagram of various methods herein.

FIG. 9 is flowchart illustrating exemplary methods herein. In item 300, these methods receive a print job (item 110, FIG. 3) comprising a multi-color image, into an image processor. In item 302, the image processor automatically generates a base color sample image (item 120, FIG. 4) and an extended color sample image (item 130, FIG. 5) for the multi-color image. Again these sample images 120, 130 could be produced for alternative extension colors, different DFE's or different printing engines with different capabilities; and the terms "base" color sample image and "extended" color sample image are used herein for naming convenience.

These methods perform the processing in item 302 by automatically generating an electronic image of the printed appearance of the multi-color image using a base colorant set of base colors to generate the base color sample image 120, and by automatically generating an electronic image of the printed appearance of the multi-color image using the base colorant set combined with an extension color to generate the extended color sample image 130. Thus, the process in item 302 of generating the base color sample image and the extended color sample image comprises raster image processing the multi-color image to produce different bitmaps for the base color sample image 120 and the extended color sample image 130.

In item 304, these methods also automatically determine, using the image processor, a base color error value for pixels of the base color sample image 120 and an extended color error value for pixels of the extended color sample image 130. This processing in item 304 is performed by automatically comparing pixels in the base color sample image and the extended color sample image to a color standard. Thus, the base color error value and the extended color error value comprise color distances from the color standard, and the color standard comprises a color definition provided by a standards organization. In addition, item 304 determines color toner usage reduction; extension color toner coverage, spot color usage, etc.

As shown in item 306, these methods can display the elements shown in FIGS. 1, 2, 4, and 5 by displaying Delta-E differences numerically, displaying comparison images, displaying % coverage, etc. Using this, these methods can then display (using the electronic display) the base color sample image and the extended color sample image, as well as the amount of marking material the base color sample image and the extended color sample image would utilize to be printed. This allows the user to observe the appearance difference of using the extended color, as well as the increase or reduction of toner usage that will occur with use of the extended color.

In item 308, these methods compare the base color and extended color sample images for Delta-E value, extension color toner coverage, spot color usage, etc. Then, in item 310, the image processor identifies benefited pixels (item 142, FIG. 6) of the multi-color image (e.g., those pixels that have an error value reduction associated with the extended color that exceeds a Delta-E threshold). Thus, processing in item 310 can automatically determine how much the base color error value exceeds the extended color error value for each pixel of the multi-color image to produce the error value reduction for each pixel of the multi-color image, and compare the error value reduction for each pixel of the multi-color image to the threshold to identify the benefited pixels.

In item 312, these methods display only the benefited pixels on a contrasting background (white pixels 142 on a black background 140, show in FIG. 6) using an electronic display that is operatively connected to the image processor. After viewing a display similar to FIG. 6, the user may desire to change the Delta-E threshold. Therefore, in item 314, the electronic display can be used to display an option to change the threshold, allowing the user to adjust the level of color change considered. Once the threshold is changed in item 314, processing can return to item 310 as shown by the arrow in FIG. 9 to use the updated threshold to produce a modified FIG. 6 in item 312. Therefore, the user can iteratively adjust the threshold until satisfied with the gamut choice.

In additional processing in item 316, the image processor automatically identifies all changed pixels of the multi-color image as those that have an error value reduction that is between zero and the threshold, but do not exceed the threshold as the benefited pixels did. Similarly, in item 318, these methods display all changed pixels on the electronic image using a contrasting color, using the electronic display, as shown in FIG. 7 where the contrasting color 152 is shown overlaid on the original electronic image 110.

Once the base color and extended color sample images are compared for Delta-E value, extension color toner coverage, spot color usage, etc., in item 308, processing can proceed to item 330 to determine whether automatic use of a specific printing profile can occur. Thus, item 330 determines whether any of the following exceed a relative threshold, average Delta-E reduction, color toner usage, extension color toner coverage, dark colors and shadow detail average improvement in grayscale printing, only some colors improve (not dark colors) on average, etc. Again, these thresholds can be set by the user, as shown in FIG. 8, discussed above.

In item 332, these methods automatically select extension gamut(s), processing and/or printing machine or machine type, printing type, etc., if the user-specified trigger minimums for such automated processing are exceeded by the values identified in item 308 (such trigger minimums or thresholds are shown, for example, in FIG. 8). In addition, as shown in item 334, the user can adjust which items will cause automated profile selection, and their associated thresholds (as again shown in FIG. 8).

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to perform the pixel-based image processing discussed above, the manual process would be sufficiently inaccurate and take an excessive amount of time so as to render the results useless. Specifically, processes such as rasterizing images, comparing electronic images to color standards, calculating toner utilizations, etc., requires the utilization of different specialized machines, and humans performing such processing would not produce useful results because of the time lag, inconsistency, and inaccuracy humans would introduce into the results.

Therefore, for example, the electronic pixel-based image processing performed by these devices cannot be performed manually (because it would take decades or lifetimes) and is integral with the processes performed by methods herein. Further, such machine-only processes are not mere "post-solution activity" because the image processing, rasterization, automated print profile selection, etc., utilize special-purpose equipment (image processors, printers, digital imaging communication equipment, etc.) that are distinct from a general-purpose processor.

Additionally, the methods herein solve many highly complex technological problems. For example, as mentioned above, providers suffer from the technological problem of not being fully capable of effectively selecting extended gamuts and other print profiles. Methods herein solve this technological problem by visually providing users with cost and benefit information, and by automatically selecting gamuts and print profiles. This increases the quality of the images produced by machines, reduces reprinting, and reduces user frustration. By granting such benefits, the methods herein reduce the amount and complexity of hardware and software needed to be purchased, installed, and maintained, thereby solving a substantial technological problem that exists today.

Figure 10:
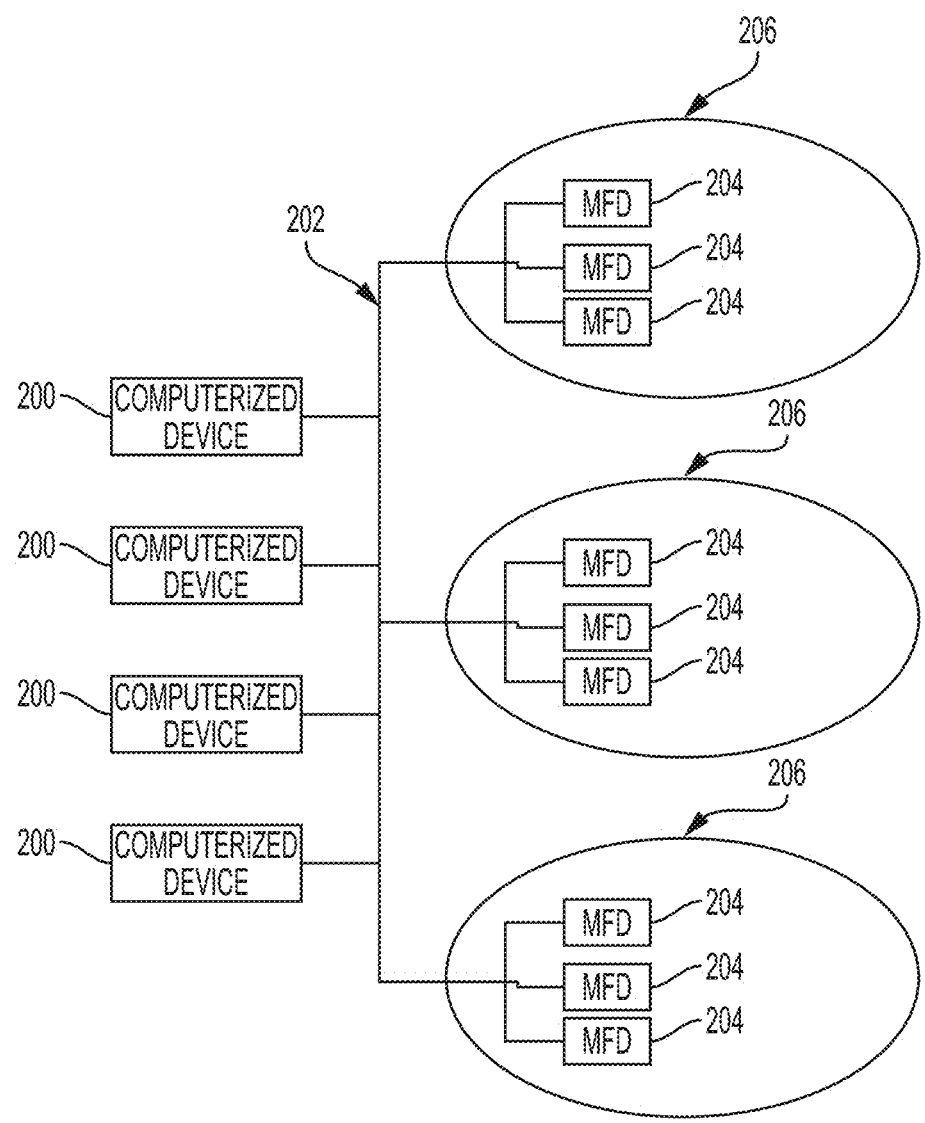
FIG. 10 is a schematic diagram illustrating systems herein.

As shown in FIG. 10, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 11:
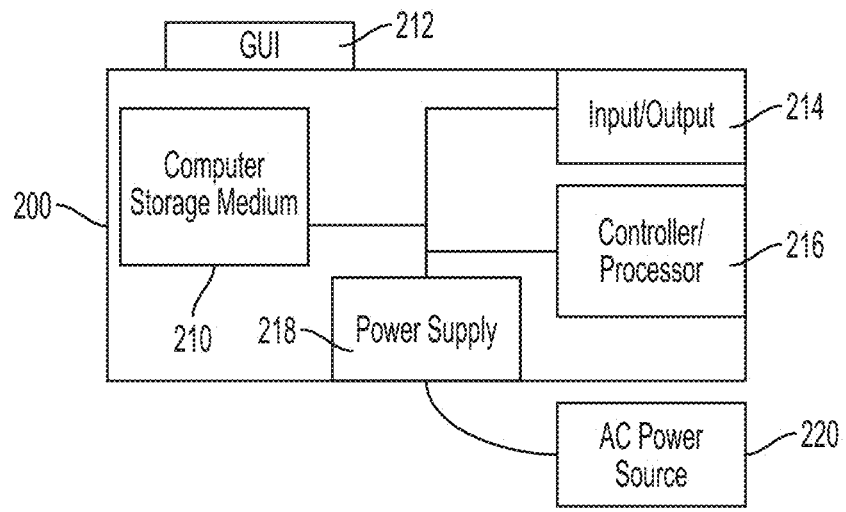
FIG. 11 is a schematic diagram illustrating devices herein.

FIG. 11 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 11, a body housing has one or more functional components that operate on power supplied from an alternating current (AC) source 220 by the power supply 218. The power supply 218 can comprise a common power conversion unit, power storage element (e.g., a battery, etc), etc.

Figure 12:
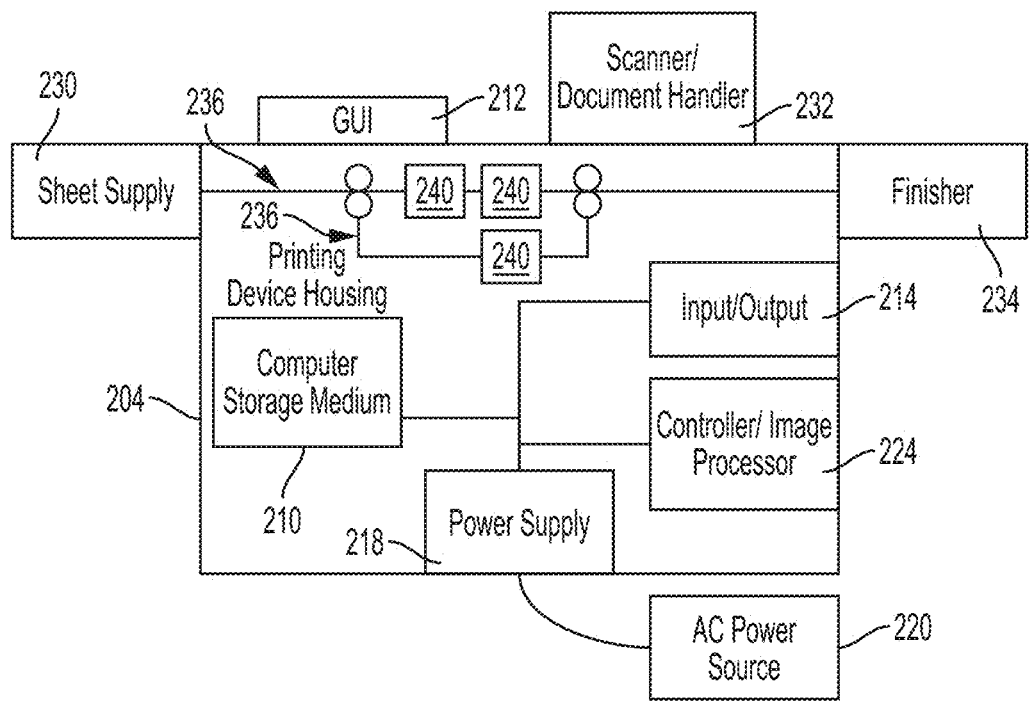
FIG. 12 is a schematic diagram illustrating devices herein.

FIG. 12 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Thus, the apparatuses (printers 204, machines 200, systems (FIG. 10), etc.) disclosed herein include, among other components, an image processor 224 (that receives a print job comprising a multi-color image) and an electronic display 212 operatively connected to the image processor 224.

The image processor 224 generates (is therefore adapted to or configured to generate) a base color sample image and an extended color sample image for the multi-color image. The image processor 224 does this by automatically generating (being therefore adapted to or configured to generate) an electronic image of the printed appearance of the multi-color image using a base colorant set (of base colors) to generate the base color sample image. The image processor 224 also does this by automatically generating (being therefore adapted to or configured to generate) an electronic image of the printed appearance of the multi-color image using the base colorant set combined with an extension color to generate the extended color sample image.

More specifically, the image processor 224 generates (is therefore adapted to or configured to generate) the base color sample image and the extended color sample image by raster image processing (being therefore adapted to or configured to raster image process) the multi-color image to produce different bitmaps for the base color sample image and the extended color sample image.

The image processor 224 also determines (is therefore adapted to or configured to determine) a base color error value for pixels of the base color sample image and an extended color error value for pixels of the extended color sample image. The image processor 224 does this by automatically comparing (being therefore adapted to or configured to compare) pixels in the base color sample image and the extended color sample image to a color standard.

The image processor 224 also identifies (is therefore adapted to or configured to identify) benefited pixels of the multi-color image that have an error value reduction associated with the extended color that exceeds a threshold. The image processor 224 does this by automatically determining how much (being therefore adapted to or configured to compare) the base color error value exceeds the extended color error value for each pixel of the multi-color image to produce the error value reduction for each pixel of the multi-color image, and by comparing (being therefore adapted to or configured to compare) the error value reduction for each pixel of the multi-color image to the threshold to identify the benefited pixels. The electronic display 212 provides (is therefore adapted to or configured to provide) an option to change the threshold. The error value reduction that exceeds the threshold defines a minimum visually perceptible difference between colors. The base color error value and the extended color error value comprise color distances from the color standard. The color standard comprises a color definition provided by a standards organization. The electronic display 212 display 212s (is therefore adapted to or configured to display 212) only the benefited pixels on a contrasting background and/or the processor 224 can be configures to automatically print the electronic image using the second print processing if the benefited pixels exceed a minimum value (e.g., exceed a minimum average Delta-E reduction, cover more that a minimum area of the printed image, etc.).

The image processor 224 also identifies (is therefore adapted to or configured to identify) changed pixels of the multi-color image that have an error value reduction that is between zero and the threshold. Thus, the electronic display 212 display 212s (is therefore adapted to or configured to display 212) the changed pixels on the electronic image using a contrasting color.

Further, the image processor 224 identifies (is therefore adapted to or configured to identify) the amount of marking material the base color sample image and the extended color sample image would utilize to be printed. Therefore, the electronic display 212 display 212s (is therefore adapted to or configured to display 212) the base color sample image and the extended color sample image and the amount of marking material the base color sample image and the extended color sample image would utilize to be printed to help the user to decide whether to use the extended color.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   generating an electronic image of the printed appearance of a multi-color image using first print processing to generate a first sample image;
   generating an electronic image of the printed appearance of said multi-color image using second print processing to generate a second sample image;
   comparing pixels in said first sample image and said second sample image to a color standard to generate a first error value for pixels of said first sample image and a second error value for pixels of said second sample image;
   determining how much said first error value exceeds said second error value for each pixel of said multi-color image to produce an error value reduction associated with said second print processing for each said pixel of said multi-color image;
   comparing said error value reduction for each said pixel of said multi-color image to a threshold to identify benefited pixels of said multi-color image that have an error value reduction difference that exceeds said threshold; and
   printing said electronic image using said second print processing based on said benefited pixels exceeding a minimum value.

2. The method according to claim 1, further comprising identifying changed pixels of said multi-color image where said error value reduction is between zero and said threshold; and
   displaying said changed pixels on said electronic image using a contrasting color.

3. The method according to claim 1, further comprising identifying an amount of marking material said first sample image and said second sample image would utilize to be printed; and
   displaying said first sample image and said second sample image and said amount of marking material said first sample image and said second sample image would utilize to be printed.

4. The method according to claim 1, further comprising providing an option to change said threshold.

5. The method according to claim 1, said error value reduction that exceeds said threshold defines a minimum visually perceptible difference between colors.

6. The method according to claim 1, said first error value and said second error value comprise color distances from said color standard, and said color standard comprises a color definition provided by a standards organization.

7. The method according to claim 1, said generating said first sample image and said second sample image comprises raster image processing said multi-color image to produce different bitmaps for said first sample image and said second sample image.

8. A method comprising:
   receiving, into an image processor, a print job comprising a multi-color image;
   generating, by said image processor, a base color sample image and an extended color sample image for said multi-color image by automatically generating an electronic image of the printed appearance of said multi-color image using a base colorant set of base colors to generate said base color sample image, and by automatically generating an electronic image of the printed appearance of said multi-color image using said base colorant set combined with an extension color to generate said extended color sample image;
   determining, by said image processor, a base color error value for pixels of said base color sample image and an extended color error value for pixels of said extended color sample image by automatically comparing pixels in said base color sample image and said extended color sample image to a color standard;
   identifying, by said image processor, benefited pixels of said multi-color image that have an error value reduction associated with said extended color that exceeds a threshold by automatically determining how much said base color error value exceeds said extended color error value for each pixel of said multi-color image to produce said error value reduction for each said pixel of said multi-color image, and by comparing said error value reduction for each said pixel of said multi-color image to said threshold to identify said benefited pixels;
   displaying, by an electronic display operatively connected to said image processor, only said benefited pixels on a contrasting background; and
   printing said electronic image using said using said base colorant set combined with said extension color based on said benefited pixels exceeding a minimum value.

9. The method according to claim 8, further comprising identifying, by said image processor, changed pixels of said multi-color image where said error value reduction is between zero and said threshold; and
   displaying, by said electronic display, said changed pixels on said electronic image using a contrasting color.

10. The method according to claim 8, further comprising identifying, by said image processor, an amount of marking material said base color sample image and said extended color sample image would utilize to be printed; and
   displaying, by said electronic display, said base color sample image and said extended color sample image and said amount of marking material said base color sample image and said extended color sample image would utilize to be printed.

11. The method according to claim 8, further comprising providing, by said electronic display, an option to change said threshold.

12. The method according to claim 8, said error value reduction that exceeds said threshold defines a minimum visually perceptible difference between colors.

13. The method according to claim 8, said base color error value and said extended color error value comprise color distances from said color standard, and said color standard comprises a color definition provided by a standards organization.

14. The method according to claim 8, said generating said base color sample image and said extended color sample image comprises raster image processing said multi-color image to produce different bitmaps for said base color sample image and said extended color sample image.

15. An apparatus comprising:
   an image processor receiving a print job comprising a multi-color image; and
   an electronic display operatively connected to said image processor,
   said image processor generates a base color sample image and an extended color sample image for said multi-color image by automatically generating an electronic image of the printed appearance of said multi-color image using a base colorant set of base colors to generate said base color sample image, and by automatically generating an electronic image of the printed appearance of said multi-color image using said base colorant set combined with an extension color to generate said extended color sample image,
   said image processor determines a base color error value for pixels of said base color sample image and an extended color error value for pixels of said extended color sample image by automatically comparing pixels in said base color sample image and said extended color sample image to a color standard,
   said image processor identifies benefited pixels of said multi-color image that have an error value reduction associated with said extended color that exceeds a threshold by automatically determining how much said base color error value exceeds said extended color error value for each pixel of said multi-color image to produce said error value reduction for each said pixel of said multi-color image, and by comparing said error value reduction for each said pixel of said multi-color image to said threshold to identify said benefited pixels, and
   said electronic display displays only said benefited pixels on a contrasting background.

16. The apparatus according to claim 15, said image processor identifies changed pixels of said multi-color image where error value reduction is between zero and said threshold; and
   said electronic display displays said changed pixels on said electronic image using a contrasting color.

17. The apparatus according to claim 15, said image processor identifies an amount of marking material said base color sample image and said extended color sample image would utilize to be printed; and
   said electronic display displays said base color sample image and said extended color sample image and said amount of marking material said base color sample image and said extended color sample image would utilize to be printed.

18. The apparatus according to claim 15, said electronic displays provides an option to change said threshold.

19. The apparatus according to claim 15, said error value reduction that exceeds said threshold defines a minimum visually perceptible difference between colors,
   said base color error value and said extended color error value comprise color distances from said color standard, and
   said color standard comprises a color definition provided by a standards organization.

20. The apparatus according to claim 15, said image processor generates said base color sample image and said extended color sample image by raster image processing said multi-color image to produce different bitmaps for said base color sample image and said extended color sample image.

\* \* \* \* \*